April 20, 1943. E. G. GUENZEL 2,316,859
APPARATUS FOR WELDING
Filed Oct. 27, 1941
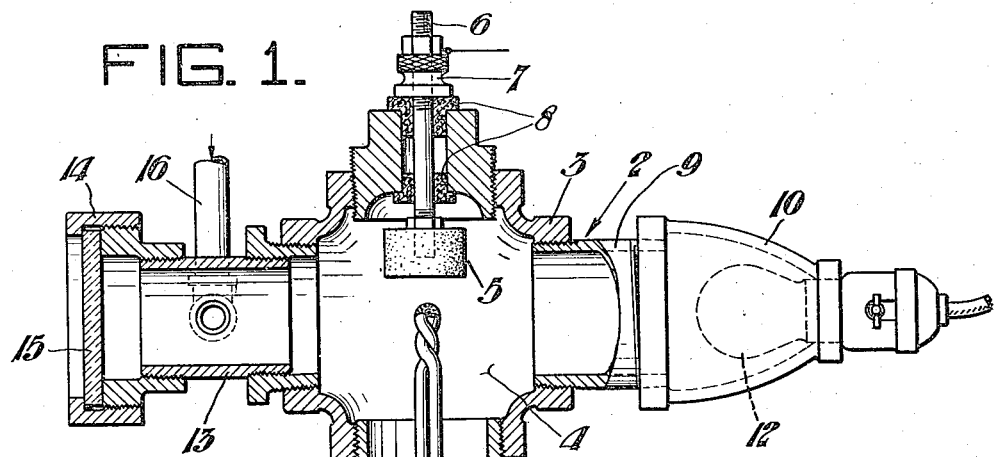
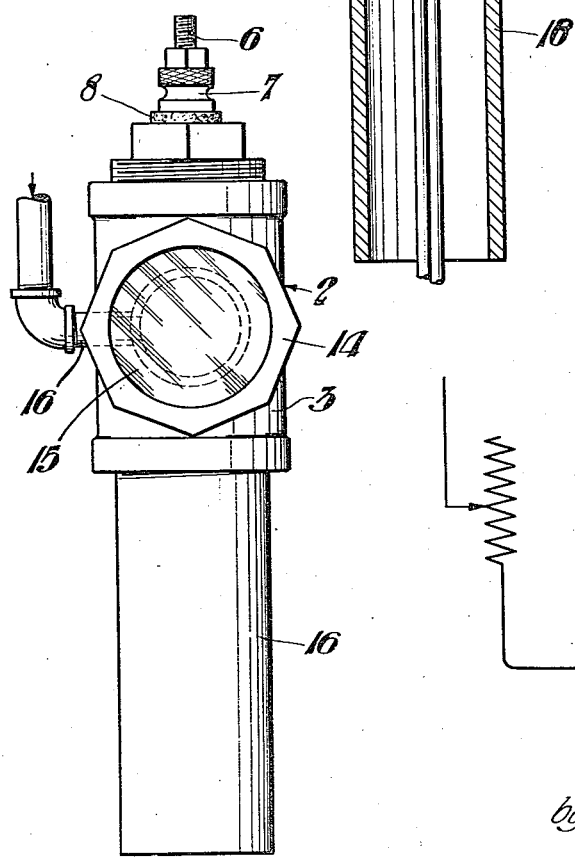
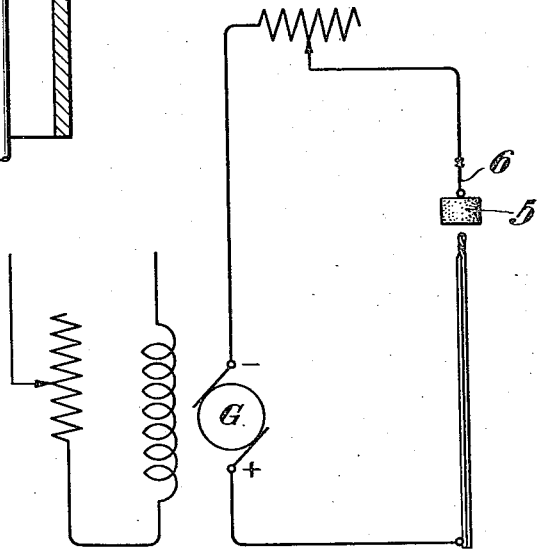
Inventor:
ERNEST G. GUENZEL,
by John E. Jackson
his Attorney.

Patented Apr. 20, 1943

2,316,859

UNITED STATES PATENT OFFICE 2,316,859

APPARATUS FOR WELDING

Ernest G. Guenzel, Cleveland, Ohio, assignor to The American Steel and Wire Company of New Jersey, a corporation of New Jersey Application October 27, 1941, Serial No. 416,728

6 Claims. (Cl. 219—8)

This invention relates to welding and, particularly, to an improved apparatus for and method of welding iron-constantan thermocouples and the like.

It is the practice to make thermocouples by combining iron and constantan into an integral unit. In such case, both the iron and constantan usually are provided in the form of a wire, and the ends of the same are welded together to form a thermocouple.

It is generally known that it is extremely difficult to produce consistently good welds on iron-constantan thermocouples by using on oxy-acetylene flame. This is especially true with the smaller gauge thermocouples, which are frequently used for experimental work. It has been found that a burnt weld, which frequently occurs in thermocouples welded in such a manner, results in a considerable error in the millivoltage characteristic of the thermocouple and also in a change in calibration in a very short time at elevated temperatures, particularly in a reducing atmosphere, which, of course, is undesirable.

Accordingly, it is the general object of the present invention to provide an improved means of welding such thermocouples and other articles so as to obtain a constantly good and bright weld at all times, whereby the above mentioned disadvantages are eliminated.

It is another object of the invention to provide an improved apparatus for and method of welding thermocouples of the class described, and the like, which is simple and inexpensive in its construction and use and, at the same time, produces an efficient and effective weld.

Various other objects and advantages of this invention will become more apparent during the course of the following specification and will be particularly pointed out in the appended claims.

In the accompanying drawing there is shown, for the purpose of illustration, one embodiment which my invention may assume in practice.

In the drawing:

Figure 1 is a longitudinal section through the improved welding apparatus of my invention;

Figure 2 is a side elevation thereof; and

Figure 3 is a wiring diagram showing the electrode connected to the negative side of the line, and the article to be welded, to the positive side thereof.

Referring more particularly to the drawing, the improved apparatus of my invention consists preferably of a longitudinally extending body member 2 which, in the present instance, is shown made from a plurality of standard pipe fittings, but it will be understood that it may be made in any other suitable manner. The body member comprises a cross or T pipe connecting member 3 having a chamber 4 arranged therewithin. There is arranged within the chamber 4, preferably to one side of the body member 2 and the cross member 3, preferably a carbon electrode 5 which is supported therein, preferably by means of a threaded copper rod 6 and a nut 7 extending outwardly through an opening in one side of the cross or T member 3. The copper rod is insulated from the body member 2 preferably by means of a pair of fiber bushings 8.

There is connected to the opening in one side of the cross or T member 3, a nipple 9 preferably having a bell-shaped member 10 arranged on the extreme outer end thereof. There is mounted within the bell-shaped member 10 preferably an incandescent lamp 12 or any other suitable source of light.

Directly opposite from the lamp 12 and on the opposite side of the electrode 5 there is connected to an opening in the cross or T member 3 another nipple 13 having a head member 14 arranged on the extreme outer end thereof. There is disposed within the head member 14 a window or glass filter 15 for a purpose hereinafter to be described. There is connected, preferably to the nipple 13 between the head 14 and the cross member 3, a pipe connection 16 for the purpose of introducing a non-oxidizing gas into the chamber 4 within the body or cross member 3. Intermediate the length of the body member 2 directly opposite the electrode 5 there is connected to an opening in the cross member 3 a relatively long nipple 18 with the outer end thereof being open.

The apparatus of the present invention is used in the following manner. Before the welding operation is started, a non-oxidizing gas is introduced into the chamber 4 around the electrode 5 therein by means of the pipe connection 16 so as to provide a reducing atmosphere within the chamber, and so as to assure that very little oxygen remains in the chamber. The gas is exhausted through the opening in the lower end of the nipple 18. The carbon electrode 5 is connected to the negative side of a suitable direct current potential and the thermocouple or article to be welded is connected to the positive side thereof. The thermocouple or article to be welded is then inserted through the opening at the bottom of the nipple-like member 18 into the gas filled chamber 4 and moved thereinto until the carbon electrode is contacted thereby. The thermocouple or article is then lowered a short distance and the resulting arc produces a bright non-oxidized weld in a relatively short time. When the weld has been completed, the thermocouple or article is moved away from the electrode until the welding arc is broken and is allowed to remain in the reducing atmosphere in the chamber until the weld has cooled sufficiently to prevent oxidation thereof. It is preferable that the non-oxidizing gas be permitted to flow continuously into the chamber 4 through the connection 16 while the welding operation is being performed so as to maintain the chamber free of oxygen. The non-oxidizing gas inlet is placed in the nipple 13 preferably between the carbon electrode 5 and the filter or window 15, so as to maintain the window cool and clean at all times.

It will be seen that the article, when positioned in the chamber 4 opposite the electrode 5, is positioned between the lamp 12 at one end of the body member and the window or glass filter at the opposite end thereof. The operator views the thermocouple or article being welded through the window or glass filter 15 and it will be seen that the thermocouple or article is silhouetted, thus making it easier for the operator to establish the welding arc and to complete the weld of the thermocouple or the article being welded.

As a result of my invention, it will be seen that there is provided an apparatus for welding thermocouples and the like which can be conveniently made from standard pipe fittings and, at the same time, an apparatus which produces clean and effective welds in a most economical manner. It will also be seen that there is provided an apparatus which is easy and convenient to use and, in addition, an apparatus which is rugged in its construction and safe in its use.

While I have shown and described one specific embodiment of my invention, it will be understood that this embodiment is merely for the purpose of illustration and description and that various other forms may be devised within the scope of my invention, as defined in the appended claims.

I claim:

1. Welding apparatus of the class described including, in combination, a body member having a chamber arranged therein, an electrode positioned in the chamber in said body member, said body member having an opening therein directly opposite said electrode and communicating with the chamber therein through which the article to be welded is adapted to be introduced thereinto, means carried by said body member for supplying a source of light into said chamber and to one side of the electrode therein, and means carried by said body member directly opposite said source of light on the opposite side of said chamber and the electrode therein for viewing the article in the chamber as it is being welded whereby the article when positioned in said chamber is silhouetted through the viewing means due to the source of light positioned therebehind.

2. Welding apparatus of the class described including, in combination, a body member having a chamber arranged therein, an electrode positioned in the chamber in said body member, said body member having an opening therein directly opposite said electrode and communicating with the chamber therein through which the article to be welded is adapted to be introduced thereinto, a lamp carried by said body member to one side of said chamber and the electrode therein, and means carried by said body member directly opposite said lamp on the opposite side of said chamber and the electrode therein for viewing the article in the chamber as it is being welded whereby the article when positioned in said chamber is silhouetted through the viewing means due to the light from the lamp positioned therebehind.

3. Welding apparatus of the class described including, in combination, a tubular member, an electrode arranged within said tubular member intermediate the length thereof, said tubular member having an opening in the said wall thereof at a point directly opposite said electrode through which the article to be welded is adapted to be introduced thereinto, means carried by said tubular member at one end thereof for supplying a source of light thereinto, and means arranged directly opposite said source of light at the opposite end of said tubular member for viewing the article as it is being welded whereby the article when positioned in said tubular member opposite the electrode therein is silhouetted through the viewing means due to the source of light positioned therebehind.

4. Welding apparatus of the class described comprising a longitudinally extending hollow body member consisting of a plurality of pipes including a pipe connection arranged intermediate the length thereof, an electrode extending into said pipe connection, said pipe connection having an opening arranged in the wall thereof directly opposite said electrode through which the article to be welded is adapted to be introduced thereinto and manipulated therein, and means arranged at one end of said body member for viewing the article therein as it is being welded.

5. Welding apparatus as defined in claim 4 including means arranged at the opposite end of the body member from the viewing means for supplying a source of light thereinto whereby the article when positioned in said body member will be silhouetted when observed through said viewing means.

6. Welding apparatus of the class described comprising a longitudinally extending hollow body member consisting of a plurality of pipe connections including a cross member, a nipple arranged in directly opposed openings thereof, an electrode arranged in one of the openings in said cross member and extending thereinto substantially perpendicular to said nipples, another nipple arranged in the opening directly opposite said electrode substantially perpendicular to said first-mentioned nipples through which the article to be welded is introduced and adapted to be manipulated in said cross member adjacent said electrode, means arranged on the outer end of one of said first-mentioned nipples for viewing the article in said cross member as it is being welded, and means arranged on the outer end of the other of said first-mentioned nipples for supplying a source of light thereinto whereby the article when positioned in said cross member will be silhouetted when observed through said viewing means.

ERNEST G. GUENZEL.